(12) United States Patent
Bondesen et al.

(10) Patent No.: US 9,215,590 B2
(45) Date of Patent: Dec. 15, 2015

(54) AUTHENTICATION USING VEHICLE DATA PAIRING

(71) Applicant: Bank of America Corporation, Charlotte, NC (US)

(72) Inventors: Laura C. Bondesen, Charlotte, NC (US); Alicia C. Jones, Charlotte, NC (US); David C. McCoy, Charlotte, NC (US); Shaun J. Abraham, Wesley Chapel, FL (US)

(73) Assignee: Bank of America Corporation, Charlotte, NC (US)

( * ) Notice: Subject to any disclaimer, the term of this patent is extended or adjusted under 35 U.S.C. 154(b) by 170 days.

(21) Appl. No.: 13/649,361

(22) Filed: Oct. 11, 2012

(65) Prior Publication Data
US 2013/0281017 A1 Oct. 24, 2013

Related U.S. Application Data

(60) Provisional application No. 61/636,200, filed on Apr. 20, 2012.

(51) Int. Cl.
| | | |
|---|---|---|
| *H04W 4/20* | (2009.01) | |
| *H04W 4/04* | (2009.01) | |
| *H04W 4/00* | (2009.01) | |
| *H04W 12/06* | (2009.01) | |
| *H04L 29/08* | (2006.01) | |
| *H04L 29/06* | (2006.01) | |

(52) U.S. Cl.
CPC .......... *H04W 12/06* (2013.01); *H04L 63/0884* (2013.01); *H04L 67/12* (2013.01); *H04W 4/008* (2013.01); *H04W 4/046* (2013.01); *H04W 4/206* (2013.01)

(58) Field of Classification Search
CPC ... H04W 4/008; H04W 12/06; H04W 76/023; H04W 84/18; H04W 4/046; H04W 88/06; H04B 7/18593; H04L 9/08; H04L 9/32
USPC ......................... 455/41.2, 41.3, 344, 410, 411
See application file for complete search history.

(56) References Cited

U.S. PATENT DOCUMENTS

| | | |
|---|---|---|
| 5,559,707 A | 9/1996 | DeLorme et al. |
| 6,321,158 B1 | 11/2001 | DeLorme et al. |
| 6,405,123 B1 | 6/2002 | Rennard et al. |
| 6,766,160 B1 | 7/2004 | Lemilainen et al. |
| 7,099,773 B2 | 8/2006 | Linn |
| 7,149,625 B2 | 12/2006 | Mathews et al. |
| 7,307,513 B2 | 12/2007 | Shutter et al. |
| 7,363,129 B1 | 4/2008 | Barnicle et al. |
| 7,386,392 B1 | 6/2008 | Kabel et al. |
| 7,403,851 B2 | 7/2008 | Kaufman et al. |

(Continued)

*Primary Examiner* — Lewis West
(74) *Attorney, Agent, or Firm* — Banner & Witcoff, Ltd.; Michael A. Springs

(57) ABSTRACT

Various examples are disclosed of how to leverage technology in a vehicle to provide various services in a convenient manner. For example, the pairing of the portable device with the on-board computer of the vehicle may be utilized as a level of authorization to provide certain services in a more automated and/or convenient way to the vehicle driver or other occupant of the vehicle, such as by authenticating wireless transactions with entities external to the vehicle using device pairing technology, and by modifying vehicle navigation routes to include suggested nearby points of interest that may be determined to be of particular value to a vehicle occupant.

12 Claims, 5 Drawing Sheets

(56) References Cited

U.S. PATENT DOCUMENTS

| | | |
|---|---|---|
| 7,487,112 B2 | 2/2009 | Barnes, Jr. |
| 7,577,459 B2 | 8/2009 | Tuomela et al. |
| 7,590,246 B2 | 9/2009 | Calmels et al. |
| 7,606,560 B2 | 10/2009 | Labrou et al. |
| 7,805,241 B2 | 9/2010 | Sato |
| 7,831,827 B2 | 11/2010 | Walmsley |
| 7,835,859 B2 | 11/2010 | Bill |
| 7,949,464 B2 | 5/2011 | Kaplan et al. |
| 8,060,308 B2 | 11/2011 | Breed |
| 8,073,614 B2 | 12/2011 | Coughlin et al. |
| 8,099,761 B2 | 1/2012 | Ganapathy |
| 8,190,129 B2 | 5/2012 | Ayed |
| 8,195,467 B2 | 6/2012 | Mozer et al. |
| 8,205,081 B2 | 6/2012 | Omernick et al. |
| 8,626,144 B2 * | 1/2014 | Talty et al. .................... 455/418 |
| 2003/0207682 A1 * | 11/2003 | Videtich ........................ 455/410 |
| 2004/0185842 A1 * | 9/2004 | Spaur et al. ................... 455/420 |
| 2005/0136949 A1 | 6/2005 | Barnes |
| 2008/0126261 A1 | 5/2008 | Lovett |
| 2008/0140309 A1 | 6/2008 | Jendbro |
| 2009/0132813 A1 | 5/2009 | Schibuk |
| 2009/0140839 A1 | 6/2009 | Bishop et al. |
| 2010/0076764 A1 * | 3/2010 | Chengalvarayan ........... 704/251 |
| 2010/0241857 A1 * | 9/2010 | Okude et al. .................. 713/168 |
| 2011/0106681 A1 | 5/2011 | Cockerell et al. |
| 2011/0177780 A1 * | 7/2011 | Sato et al. ..................... 455/41.1 |
| 2011/0202757 A1 | 8/2011 | Nakagawa et al. |
| 2011/0237274 A1 | 9/2011 | Wong et al. |
| 2011/0293095 A1 | 12/2011 | Ayed |
| 2011/0307168 A1 | 12/2011 | Kieff |
| 2012/0029807 A1 | 2/2012 | Schunder et al. |
| 2012/0046864 A1 | 2/2012 | Zilka |
| 2012/0053825 A1 | 3/2012 | Schunder |
| 2012/0072051 A1 | 3/2012 | Koon et al. |
| 2012/0083964 A1 | 4/2012 | Montemerlo et al. |
| 2012/0089300 A1 | 4/2012 | Wolterman |
| 2012/0109721 A1 | 5/2012 | Cebon et al. |
| 2012/0130790 A1 | 5/2012 | Lyons et al. |
| 2012/0130866 A1 | 5/2012 | Cooke et al. |
| 2012/0166076 A1 | 6/2012 | Hardy |
| 2012/0254960 A1 * | 10/2012 | Lortz et al. ....................... 726/7 |
| 2013/0017816 A1 * | 1/2013 | Talty et al. ..................... 455/418 |
| 2013/0073195 A1 | 3/2013 | Nesbitt et al. |
| 2013/0265178 A1 * | 10/2013 | Tengler et al. ................ 340/989 |

* cited by examiner

AUTHENTICATION USING VEHICLE DATA PAIRING

The present application claims priority to U.S. Provisional Patent Application Ser. No. 61/636,200, filed Apr. 20, 2012, entitled, "Data-Connected Vehicle," hereby incorporated by reference as to its entirety.

BACKGROUND

Many new vehicles, such as cars, trucks, SUVs, vans, and buses, are more commonly being equipped with data communication capabilities. For example, it is not unusual for a new vehicle to include wireless (e.g., BLUETOOTH) connectivity with portable devices such as smart phones, as well as GPS navigation including a computer and display. These devices may be built in to the vehicle (e.g., at the factory, and may include a dashboard display) or may be installed by the vehicle owner using an aftermarket device coupled to the vehicle. In some cases, the portable device may wirelessly interact with the computer and display. For instance, a call may be initiated and/or answered by interacting with the display and/or via a voice command.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

It may be desirable to leverage such technology in a vehicle to provide various services in a convenient manner. For example, the pairing of the portable device with the on-board computer of the vehicle may be utilized as a level of authorization to provide certain services in a more automated and/or convenient way to the vehicle driver or other occupant of the vehicle.

As another example, a method, device, software, and/or a system may provide at least the following functionality: electronically pairing a portable electronic device with an on-board computer of a vehicle; wirelessly conducting a transaction between (1) one or both of the on-board computer and the portable electronic device and (2) another computing device, wherein said another computing device is located external to the vehicle; and authenticating the transaction by sending the another computing device authentication information associated with the pairing of the portable electronic device with the on-board computer.

As yet another example, a method, device, software, and/or a system may provide at least the following functionality: electronically pairing the portable electronic device with an on-board computer of a vehicle; wirelessly conducting a transaction between the portable electronic device and another computing device, wherein said another computing device is located external to the vehicle; and authenticating the transaction by sending the another computing device authentication information associated with the pairing of the portable electronic device with the on-board computer.

As still another example, a method, device, software, and/or a system may provide at least the following functionality: electronically pairing the portable electronic device with an on-board computer of a vehicle; wirelessly conducting a transaction between the portable electronic device and another computing device, wherein said another computing device is located external to the vehicle; and authenticating the transaction by sending the another computing device authentication information associated with the pairing of the portable electronic device with the on-board computer.

As yet another example, a method, device, software, and/or a system may provide at least the following functionality: wirelessly receiving, by at least one computing device, an indication of a first navigation route of a vehicle from an origin to a destination; determining, by the at least one computing device, a proximity of each of a plurality of predetermined points of interest to the first navigation route, and based on the proximities, determining a first one of the points of interest; and wirelessly sending an indication of the determined first one of the points of interest.

As yet even another example, a method, device, software, and/or a system may provide at least the following functionality: determining, by at least one computing device, a first navigation route of a vehicle from an origin to a destination; wirelessly sending, by the at least one computing device, an indication of the first navigation route; wirelessly receiving, by the at least one computing device, an indication of a point of interest based on the navigation route; and modifying, by the at least one computing device, the first navigation route to generate a second navigation route from the origin to the destination that includes the point of interest.

As a still further example, a method, device, software, and/or a system may provide at least the following functionality: determining, by at least one computing device, a first navigation route of a vehicle from an origin to a destination; determining, by the at least one computing device, a proximity of each of a plurality of predetermined points of interest to the first navigation route, and based on the proximities, determining a first one of the points of interest; and modifying, by the at least one computing device, the first navigation route to generate a second navigation route from the origin to the destination that includes the point of interest.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
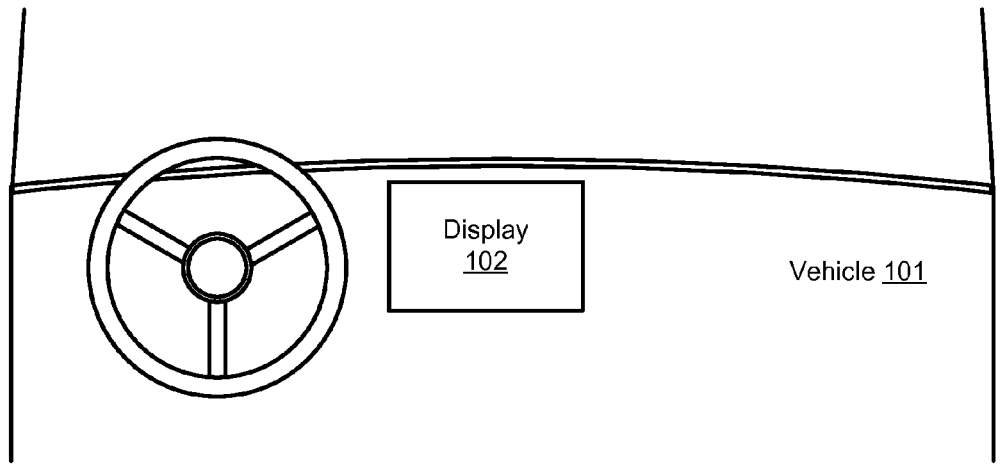
FIG. 1 shows an example view of a vehicle dashboard.

FIG. 1 shows an example view of a dashboard of a vehicle 101. In this example, the dashboard includes a display 102. Such a display 102 is often included in vehicles today and used for such functions as navigation, climate control, radio control, and telephone call control. The display 102 is controlled by an on-board vehicle computer that is typically hidden from the view of vehicle occupants, such as behind the dashboard, underneath the seats, in the engine compartment, and/or in the trunk. The display 102 may be a touch screen display or a non-touch sensitive display, and may be of any size and shape.

Figure 2:
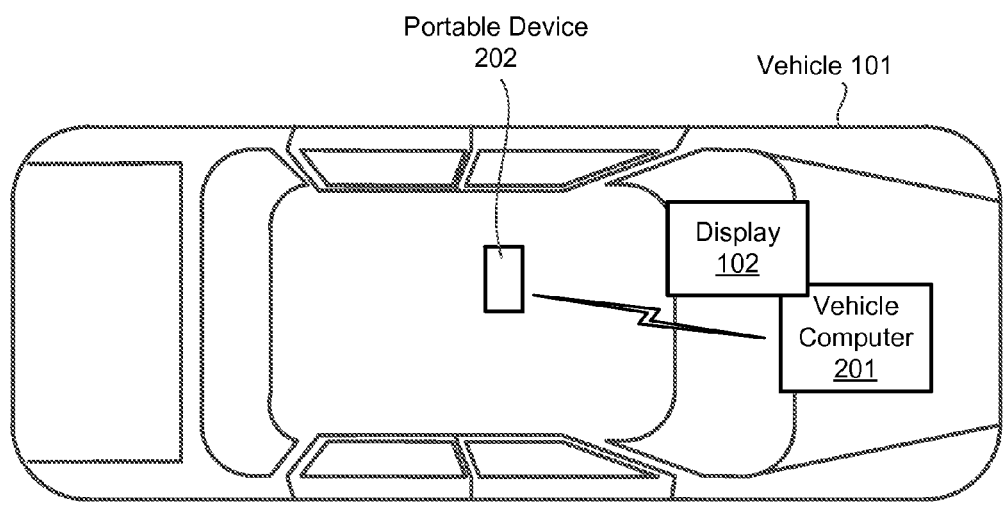
FIG. 2 is a block diagram of an example vehicle including a vehicle computer.

FIG. 2 is a block diagram showing the vehicle 101 including the display 102 and an on-board vehicle computer 201 (such as mentioned above). The locations of the blocks in FIG. 2 is not intended to necessarily be the actual physical locations within the vehicle 101 of the physical units embodying those blocks. Also shown in the vehicle 101 is a portable device 202, which may be in the possession of an occupant of the vehicle 101, such as the driver or a passenger. The portable device 202 may be any electronic device that is sufficiently portable for the above-mentioned occupant to carry on his or her person when leaving and entering the vehicle 101, and that has wireless communication capability. For example, the portable device 202 may be a cellular telephone (such as a smartphone), a laptop computer, a tablet computer, a personal digital assistant, an electronic vehicle ignition key, or the like. The portable device 202 may be configured to wirelessly communicate with the vehicle computer 201, such as via BLUETOOTH, near-field communication (NFC), wi-fi, or other radio frequency communication; infrared light; and/or via any other wireless communication technology.

It is not unusual for a vehicle computer and a cellular phone or other portable device to have the capability to wirelessly pair, or bond, with each other. For instance, it is typical that a smartphone and a vehicle computer may initially pair with each other by creating a link key (or other shared secret) and/or other identifying information with each other via BLUETOOTH in order to establish a pairing. If the same link key is stored in both devices, then the two devices are considered paired. And, once the pairing has been established, the two devices may communicate with each other in an encrypted manner using the link key. Once the pairing is established, the two devices (the smartphone and the vehicle computer) will usually automatically re-establish the pairing whenever the two devices are physically separated and then physically brought back together within a sufficient proximity of each other. For typical automobile BLUETOOTH communications, for example, the two devices are usually sufficiently proximate to each other if they are within about 5 meters. However, this range may vary depending upon the power used and other factors. Thus, for example, when the smartphone is near or inside the vehicle and both devices (the smartphone and the vehicle computer) are powered on and utilizing wireless communication, then the two devices may automatically pair with each other after the initial pairing has been established as discussed above.

As will be discussed further below, the pairing of the portable device 103 with the vehicle computer 201 may be considered a level of established authentication that may be used as a basis of trust to perform various transactions external to the portable device 103 and vehicle computer 201 pair. For example, transactions via the portable device 103 and/or the vehicle computer 201 with a third party (such as a service provider or a retailer) may inherently be provided with a certain level of trust due to the fact that the two devices are paired with each other. A reason that this may induce a level of trust is because it may have already been established that both devices are associated with a particular user, and therefore if both devices are currently paired with each other at the time that the transaction is made, then it may be assumed that it is more likely that the transaction is legitimately being invoked or responded to by the appropriate user as compared with only one of the unpaired devices (which may have been stolen, for example) being involved in the transaction. Another way to look at this is that the portable device 202 may be considered a security token for the vehicle computer 201, or that the vehicle computer 201 may be considered a security token for the portable device 202: the presence of one of the devices being proximate to the other of the devices provides a certain level of reassurance that both devices are likely in the possession of the appropriate user at the time of the transaction.

While the portable device 202 has been previously described as including, for example, a smartphone, a smart automobile ignition key, a tablet computer, and the like, in further examples, the portable device 202 may be a dedicated device that primarily serves the purpose of a security token, without necessarily providing other functionality such as the ability to surf the web or make telephone calls. Moreover, while previous examples of pairing the portable device 202 with the vehicle computer 201 has been via wireless pairing, wired pairing may alternatively be used. For example, the portable device 202 may be a flash memory USB stick that is plugged into a USB slot in the vehicle and that contains certain pairing information such as a shared secret with the vehicle computer 201 to establish the pairing.

Figure 3:
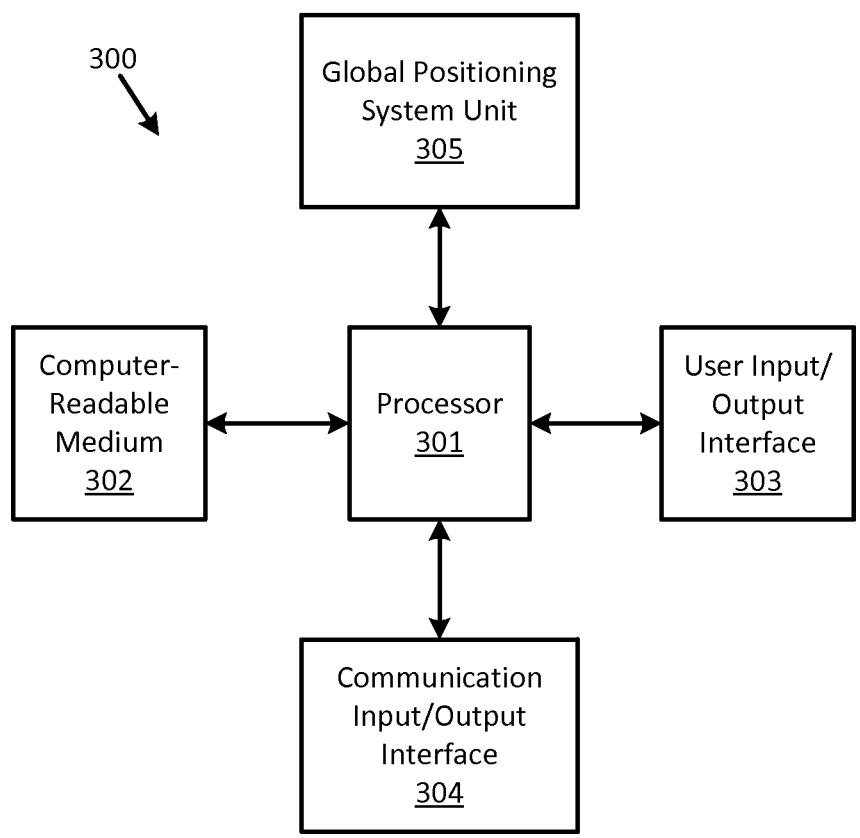
FIG. 3 is a block diagram of an example computing device that may be used to embody any elements described herein and illustrated in the drawings.
Figure 4:
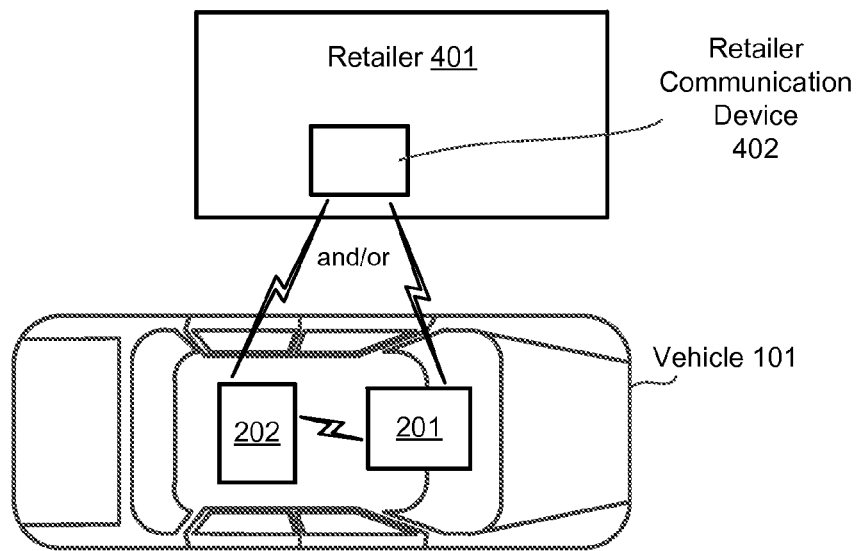
FIG. 4 is a block diagram showing an example interaction between a paired portable device and/or vehicle computer with a retailer.
Figure 5:
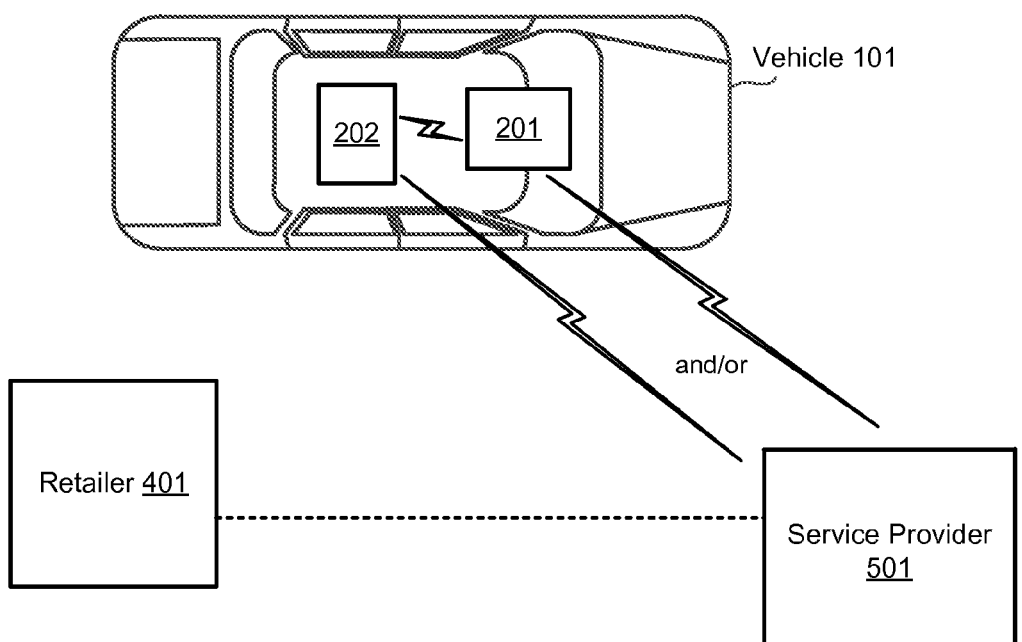
FIG. 5 is a block diagram showing an example interaction between a paired portable device and/or vehicle computer with a service provider.

FIG. 3 is a block diagram of an example computing device 300 that may be used to partially or fully embody any or all of the vehicle computer 201, the portable device 202, a retailer communication device 402 (FIG. 4), and one or more computing devices of a service provider 501 (FIG. 5). The computing device 300 may include hardware that may operate by, e.g., executing software to perform specific functions. The software, if any, may be stored on a tangible and/or non-transitory computer-readable medium 302 or other type of computer-readable data storage device in the form of computer-readable instructions. The computing device 300 may read those computer-readable instructions, and in response perform various steps as defined by those computer-readable instructions. Thus, any functions, steps, calculations, determinations discussed herein may be implemented by the computing device 300, such as by reading and executing computer-readable instructions for performing those functions, and/or by any hardware subsystem (e.g., a processor 301) from which the computing device 300 is composed. Additionally or alternatively, any of the above-mentioned functions may be implemented by the hardware of computing device 300, with or without the execution of software. For example, the computing device 300 may be or include one or more microprocessors, central processing units (CPUs), and/or other types of circuitry configured to perform some or all of the functions attributed to computing device 300. In such embodiments, the processor 301 may be implemented as or otherwise include the one or more microprocessors, CPUs, ASICs, and/or other types of circuitry.

A computing device may include any electronic, electro-optical, and/or mechanical device, or system of multiple physically separate or integrated such devices, that is able to process and manipulate information, such as in the form of data. Non-limiting examples of a computing device include one or more personal computers (e.g., desktop, tablet, or laptop), mainframes, servers, cellular phones (which may be "smart phones"), personal digital assistants, and/or a system of these in any combination or sub-combination. In addition, a given computing device may be physically located completely in one location or may be distributed amongst a plurality of locations (i.e., may implement distributive computing). A computing device may be or otherwise include a general-purpose computing device and/or a dedicated computing device configured to perform only certain limited functions.

The computer-readable medium 302 may include not only a single tangible and/or non-transitory medium or single type of such medium, but also a combination of one or more such media and/or types of such media. Examples of embodiments of the computer-readable medium 302 include, but are not limited to, one or more memories, hard drives, optical discs (such as CDs or DVDs), magnetic discs, magnetic tape drives, and other types of computer-readable data storage devices. The computer-readable medium 302 may be physically part of, or otherwise accessible by, the computing device 300, and may store the above-mentioned computer-readable instructions (e.g., software) and/or computer-readable data (i.e., information that may or may not be executable).

The computing device 300 may also include a user input/output interface 303 for receiving input from a user (e.g., via a keyboard, mouse, touch screen, an audio microphone, camera, and/or remote control) and/or for providing output to the user (e.g., via a touch screen or other display device, an audio speaker or piezoelectric element, an indicator light, a printer, and the like). For example, where the computing device 300 is part of the vehicle computer 201, the user input/output interface 303 may include the display 102.

The computing device 300 may further include a communication input/output interface 304 for communicating with other devices via wire and/or wirelessly. Such communication with other devices may be direct or it may be indirect via a wired and/or wireless network. For example, where the computing device 300 is part of the portable device 202, the communication input/output interface 304 may include a cellular communication system for communicating via a cellular telephone network with, e.g., the service provider 501 and/or the retailer 401, a BLUETOOTH wireless interface, and/or a near-field communication (NFC) wireless interface (the latter two potentially for communicating with the vehicle computer 201 and/or with the retailer communication device 402. Where the computing device 300 is part of the vehicle computer 201, the communication input/output interface 304 may include a cellular communication system for communicating via the cellular telephone network with, e.g., the service provider 501 and/or a retailer 401, a BLUETOOTH wireless interface, and/or an NFC wireless interface (the latter two potentially for communicating with the portable device 202 and/or with the retailer communication device 402.

Where the computing device 300 is part of the portable device 302 or the vehicle computer 201, the computing device 300 may further include a global positioning system (GPS) unit 305. The GPS unit 305 may provide information as to the physical location of the computing device 300. The GPS unit 305 may include a GPS antenna and/or a GPS processor. The computing device 300 may additionally or alternatively determine its position based on other information, such as by triangulating the relative signals strengths of nearby wi-fi networks and/or of cellular tower signals.

FIG. 4 is a block diagram showing an example interaction between a paired portable device and/or vehicle computer with a third party external to the vehicle 101, in this case a retailer 401. The retailer may be, for example, a business such as a fast-food restaurant with a drive-through window. The occupant of the vehicle 101 may drive to a location within wireless communication of the retailer communication device 402 (such as next to the drive-through window) and wirelessly conduct a transaction with the retailer 401. The wireless transaction may involve wireless communication between the portable device 202 and the retailer communication device 402, between the vehicle computer 201 and the retailer communication device 402, and/or between the portable device 202 and the vehicle computer 201. The fact that the portable device 202 and the vehicle computer 201 are paired at the time that the transaction is made may (as discussed above) provide a level of trust to the retailer that the purchaser (the vehicle occupant) is who he or she claims to be. Information communicated between any of the devices during the transaction may include, for example, information identifying the occupant of the vehicle 101 associated with the paired devices, information about the transaction requested (e.g., identifying the product or service purchased or rented, a monetary amount of the transaction, a time and/or date of the transaction, the parties and/or their locations involved in the transaction, and the like.), information about the result of the transaction (e.g., successful, failed, rejected, sold, rented, canceled, returned, and the like.), evidence of the pairing between the portable device 202 and the vehicle computer 201, and the like.

Where the retailer 401 is a fast-food restaurant, the transaction may involve, for example, ordering and/or payment of food at a drive-through window of the restaurant. For example, the driver of the vehicle 101 may drive the car near the restaurant, and in response the retailer communication device 402 may wirelessly transmit the menu to the vehicle computer 201 for display on the display 102. Alternatively, the vehicle computer 201 may already have a stored version of the menu and may bring it up responsive to detecting that the vehicle 101 is near the restaurant. An occupant of the vehicle 101 may, in response, select from the menu, such as via a voice or touch screen interaction. The selection may be wirelessly transmitted by the vehicle computer 201 or the portable device 202 to the retailer communication device 402. The retailer 401 may, in response, begin preparing the selected food and request payment. A payment request may be wirelessly transmitted to the vehicle computer 201 or the portable device 202, and the occupant of the vehicle 101 may confirm authorization of payment. In response, the vehicle computer 201 or the portable device 202 may wirelessly contact the occupant's financial institution (e.g., bank) and indicate that the appropriate payment should being made. Or, the retailer may wirelessly contact the financial institution to invoke the payment. Payment may be, e.g., directly from a savings or checking account, or via a credit card managed by the financial institution. Any or all of this transaction may potentially be performed without the need for the vehicle occupant to manually provide a password, PIN, or other secret. This is because the fact that the portable device 202 and the vehicle computer 201 may be paired at the time the transaction is made, and that evidence of this pairing may be provided to the retailer 401 and/or to the financial institution as reassurance that the transaction involves the appropriate party in possession of the portable device 202 and the vehicle computer 201. In these and other examples, wireless communication with the retailer communication device 402 may be via a close-range wireless connection, if desired, such as via a near-field communication (NFC) card, or via BLUETOOTH, or the like. This may be desirable as the mere detection of the presence of the vehicle 101 by the retailer communication device 402 may be sufficient for the retailer communication device 402 to perform a handshake protocol or perform some other transaction with the portable device 202 and/or the vehicle computer 201. However, the wireless communication with the retailer communication device 402 may be via any wireless technology.

The retailer 401 may be other types of businesses or other organizations, regardless of whether they are private or governmental, or whether they make money or not, such as banks or other financial institutions, car washes, movie theaters, parking lots or parking garages, gas stations, car mechanic garages, toll booths, and security gates. For instance, where the retailer 401 is a bank or other financial institution, the pairing of the vehicle computer 201 and the portable device 202 may allow the vehicle occupant to conduct certain banking transactions (e.g., check balance, check credit, etc.) without necessarily needing to enter authorizing information such as a password or PIN, as long as the two devices are paired while the transaction is initiated and/or being conducted. Where the retailer 401 is a car wash, movie theater, parking lot or parking garage, gas station, car mechanic garage, toll booth, or security gate, payment and/or passage into a restricted or pay-per-use area may be automatically granted upon wireless communication by the retailer 401 with the paired devices in the vehicle 101. In still a further example, homes for sale may have wireless communication devices installed on or near their properties, and so house-hunters driving down a street may be automatically notified (e.g., via the display 102) of whether a home they pass is being offered for sale. Moreover, because a level of trust may be automatically established by virtue of the pairing of the portable device 202 and the vehicle computer 201, the financial information of the vehicle occupant may be automatically obtained (e.g., from the occupant's financial institution account and/or stored profile information) and compared with the home information so that the vehicle occupant may be automatically notified (e.g., via the display 102) of whether the vehicle occupant may be financially qualified to purchase the home and/or what the mortgage payments would likely be. A similar process may be performed with respect to driving near offered apartment or home rentals.

Examples of further types of transactions may be, for example, performing mobile office transactions, such as accessing email, intranet, shared documents, and the like. These functions may be displayed via, e.g., the display 102, and may also be at least partially authenticated using the fact that the portable device 202 and the vehicle computer 201 are paired together.

Thus, in general, it can be seen that the pairing of the vehicle computer 201 with the portable device 202, both of which may be registered or otherwise associated with the vehicle occupant, may be used as a level of trust to provide at least partial (and potentially full) authentication for performing certain transactions, such that the transactions may not require any other authorization or may require less authorization. This may make such transactions and other services work more automatically and conveniently for the vehicle occupant.

FIG. 5 is a block diagram showing an example interaction between a paired portable device (such as the portable device 202) and/or a vehicle computer (such as the vehicle computer 201) with the service provider 501. The service provider 501 may be any type of service provider such as but not limited to the above-mentioned bank or other financial institution, a cellular communications service provider, an email provider, an Internet service provider (ISP), and/or a multimedia content provider. The service provider 501 may manage an account of the occupant of the vehicle 101, and with it, a profile of the occupant. The profile may include information such as the occupant's name, address, telephone numbers, bank account numbers, identification number, driver's license number, preferences, etc. Where profile information is needed for a transaction, the service provider 501 may provide this information wirelessly to the vehicle computer 201, the portable device 202, and/or the retailer 401. The information may be provided spontaneously or on request from one of the parties involved in the transaction. For example, where payment is requested by the retailer 401, the service provider 501 may act as a middle-man to the payment transaction and work with the financial institution and the retailer 401 to ensure that the payment transaction is successful.

The service provider 501 may additionally or alternatively provide various other services, such as navigation-related services. For example, where a navigation route is selected at the vehicle 101 (e.g., via the GPS functionality of the vehicle computer 201), information identifying the route and/or the destination may be wirelessly transmitted by the vehicle computer 201 or the portable device 202 to the service provider 501. The service provider 501 may use this information to provide certain services to the vehicle occupant and/or to other parties such as the retailer 401.

An example of such a service may operate as follows. Responsive to the vehicle occupant selecting the navigation route, the vehicle computer 201 or the portable device 202 may wirelessly transmit the information (e.g., via a cellular network) identifying the navigation route and/or the navigation destination to the service provider 501. This may be done regardless of whether the vehicle computer 201 or the portable device 202 are paired with each other. In response to the received information, the service provider 501 may determine whether there are any predetermined points of interest (POIs) that are proximate to the navigation route. Proximity may be measured using any distance measurement such as by extending a virtual region orthogonally from the navigation route by a predetermined distance (e.g., five miles) or by a distance that may depend upon the expected speed of the vehicle at a given point in the navigation route, and/or that may depend upon the road type in the navigation route, and/or that may depend upon the type of POI. The POIs may also be selected based on one or more other factors, such as based on a stored profile of interests of the vehicle occupant, or based on further commands/requests by the vehicle occupant, such as request (e.g., via voice command or touch screen input) to find a particular type of POI such as a specialty store or an ATM. Which POIs are selected by the service provider 501 may also depend upon the status of the POIs. For example, if the vehicle occupant is looking for an ATM near the navigation route, the service provider 501 may exclude ATMs that currently have a known long queue line. Or if the vehicle occupant is looking for a particular type of store, the service provider 501 may exclude those store locations known to be currently closed (or known to be closed at a time at which the vehicle 101 is predicted to be in the vicinity of the store). Further factors that may be taken into account by the service provider 501 as to whether to select a particular POI may include current or predicted vehicular traffic near the POI, weather conditions between the vehicle and the POI, and the like, how much gasoline is remaining in the vehicle 101 (e.g., the range of the vehicle 101), time of day, day of week, speed of the vehicle, direction of travel of the vehicle, and the like.

The POIs may be any types of POIs, such as but not limited to stores, restaurants, gas stations, banking centers, ATMs, homes for sale, mechanics, or the like. As an example, if the vehicle 101 is scheduled to follow a navigation route that takes the vehicle 101 on a particular road, the service provider 501 may determine that a particular POI proximate to the road would likely be interesting to the vehicle occupant, and so the service provider 501 may send information to the vehicle computer 201 or the portable device 202 identifying the POI and/or suggesting a modification to the navigation route that directs the vehicle to pass by and/or stop at the POI. The vehicle occupant may be notified of the suggestion (e.g., via the display 102) and may choose to accept or reject the suggestion. If the suggestion is accepted, then the navigation route may be automatically modified by the vehicle computer 201 or the portable device 202.

Other services that may be provided by the service provider 501 may include providing offers and deals (e.g., coupons, including group coupons) to the vehicle occupant, where the particular offers and deals may depend upon the navigation route (e.g., offers and deals relating to POIs that are proximate to the navigation route). Thus, the vehicle occupant may be automatically provided with an offer or deal (e.g., via the display 102) for a POI that may not be at the current location of the vehicle 101, but that is near the navigation route and thus is at a location near where the vehicle 101 is scheduled or otherwise expected to be in the future. Where the coupon is a group coupon, this may potentially widen the population to which the coupon may be offered to a group over a much larger geographical area, and thus may increase the chance of the coupon reaching a minimum group population to become valid. And, because not all offerees may be at the geographical location of the POI associated with the offer or deal when the offer or deal is made, this may allow a more transient group of people to be included in the offer or deal (e.g., travelers passing through an area but not living there). This may allow group coupons to be more practical in smaller populated areas, whereas currently such group coupons may only work effectively in larger cities.

The POIs may be stored on a computer-readable medium (e.g., in the form of a database) of the service provider 501, along with the locations, offers, and deals associated with the POIs. The above-mentioned services may entice businesses (such as the POIs mentioned above) to work with the service provider 501 in order to be included in the database. Thus, POIs may be motivated to have an account with the service provider 501 that would allow (e.g., for a fee charged by the service provider 501) the POIs and/or their deals and offers the opportunity to be suggested to vehicle occupants in the manner described above.

Figure 6:
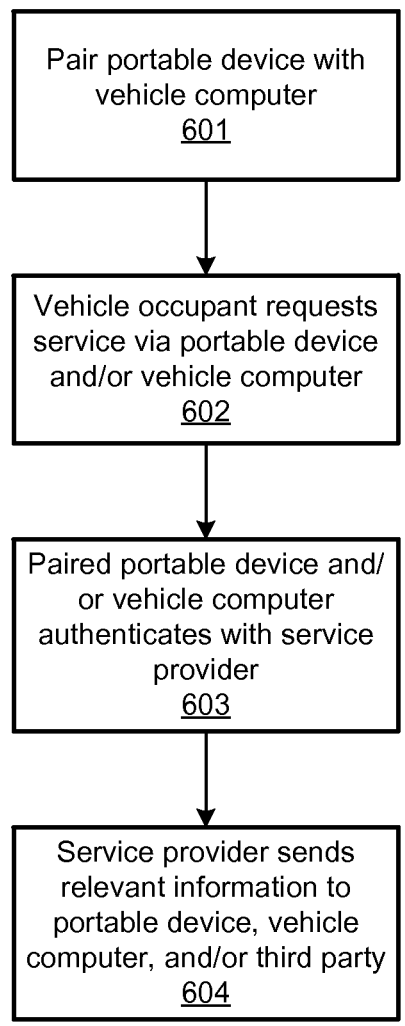
FIG. 6 is a flow chart illustrating example steps that may be performed to allow transactions to occur using the paired portable device and/or vehicle computer.

FIG. 6 is a flow chart illustrating example steps that may be performed to allow transactions to occur using a paired portable device (such as the portable device 202) and/or an on-board vehicle computer (such as the vehicle computer 201). In this example, a transaction may be performed in a manner such as previously described, using the pairing as at least partial authentication for the transaction. At step 601, the portable device 202 and the vehicle computer 201 are paired, such as in a manner previously described. At step 602, an occupant of the vehicle requests a particular transaction (e.g., to purchase a good or service) via the portable device 202 and/or via the vehicle computer 201. The request may be made, for example, by manual entry on a keypad or touchscreen (such as the display 102), or by a voice command. Alternatively, the mere fact that the vehicle 101 has entered a particular location may be sufficient to initiate or otherwise request the transaction.

At step 603, the pairing of the portable device 202 and vehicle computer 201 may be used to partially or fully authenticate the transaction. To do so, authentication information unique to the pairing may be wirelessly provided to the transacting party and/or to the service provider 501. Such authentication information may include, for example, an identifier unique to the combination of the portable device 202 and the vehicle computer 201. The authentication information may be predetermined, such as during the first time that the portable device 202 and the vehicle computer 201 are paired together (the initial pairing), and/or the authentication information may be dynamically determined such as at the time of each pairing. The authentication information may be generated by the portable device 202 and/or the vehicle computer 201, and may be generated based on, e.g., unique information provided by each of the two devices 201, 202. For example, if the portable device 202 has a first unique identifier (e.g., a product serial number or ESN) and the vehicle computer 201 has a second unique identifier (e.g., a VIN of the vehicle containing the vehicle computer 201, a product serial number, or an ESN), then the authentication information associated with the pairing may be generated based on a combination of the two unique identifiers. The authentication information may be compared with predetermined information stored by, e.g., the service provider 501, for authentication. To allow the authentication information received from the portable device 202 and/or the vehicle computer 201 to be authenticated by the service provider 501 side, the authentication information may be provided to the service provider 501 during an earlier transaction, such as during the initial pairing. Alternatively, other information from which the service provider 501 may derived the authentication information may be provided to the service provider 501.

As yet another example, one or both of the portable device 202 and/or the vehicle computer 201 may wirelessly provide some other type of reassurance to the service provider 501 or the transacting party when the two devices are paired. In any event, once the transaction is authenticated (and in addition to any further authentication that may be needed depending upon the transaction), at step 604 the service provider 501 may wirelessly send relevant information to the portable device 202, the vehicle computer 201, and/or the transacting party involved in the transaction, depending upon the nature of the transaction. The information provided by the service provider 501 may be information requested by the vehicle occupant and/or information requested by the transacting party.

Figure 7:
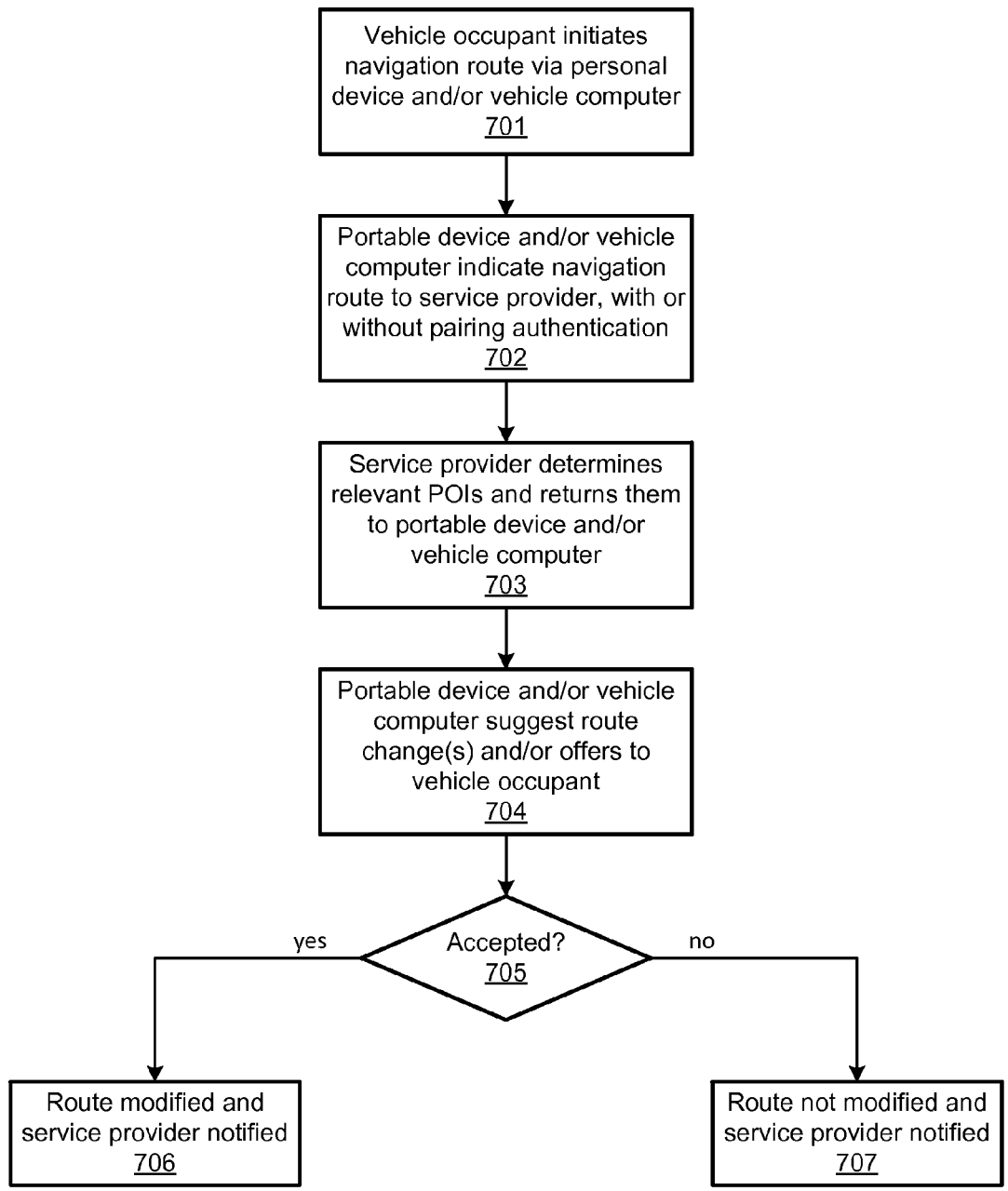
FIG. 7 is a flow chart illustrating example steps that may be performed to allow navigation routes to be modified.

FIG. 7 is a flow chart illustrating example steps that may be performed to allow navigation routes to be modified, such as in a manner previously described herein. As previously mentioned, this process may be performed regardless of whether the portable device 202 and the vehicle computer 201 are paired with each other, as authentication using the pairing may not be needed or desired. At step 701, the vehicle occupant may initiate a navigation route via the portable device 202 and/or via the vehicle computer 201. At step 702, the portable device 202 and/or the vehicle computer 201 may wirelessly send information to the service provider 501 indicating the selected navigation route and/or the navigation destination. Such information may be sent to the service provider 501 all at once, such as prior to the vehicle physically navigating/driving the navigation route, or the information may be sent at multiple times, in real time, during the driving of the navigation route. For example, the information may be sent intermittently at random or periodic intervals, at each turn dictated by the navigation route, at each point of interest already on the navigation route, and/or at any other features of the navigation route. In the latter case, the information may include only a portion of the navigation route, such as the portion remaining, and/or may indicate the current actual or scheduled/predicted location, speed, and/or direction of the vehicle. Based on this received information, at step 703 the service provider 501 may determine one or more relevant POIs based on their proximity to the navigation route (such as in a manner previously described) and wirelessly return information back to the portable device 202 and/or the vehicle computer 201 indicating the POIs and/or one or more suggestions for modifying the navigation route to take the vehicle near or at the POIs.

At step 704, the portable device 202 and/or the vehicle computer 201 may indicate (e.g., via the display 102) to the vehicle occupant the suggested POIs and/or navigation route modifications. The indication of each suggestion may be performed all at once, such as prior to actual navigation of the navigation route, and/or or the indications may be provided at various different times during navigation of the navigation route, such as when it is detected that the vehicle is within a certain distance of the point of interest to be suggested. At step 705, the vehicle occupant may indicate acceptance or rejection of the suggestions (e.g., via manual input and/or voice command). At step 706, if the suggestion(s) is/are accepted, then the portable device 202 and/or the vehicle computer 201 may modify the navigation route accordingly, and may further wirelessly notify the service provider 501 of the acceptance and/or the modifications to the navigation route. At step 707, if the suggestion(s) is/are rejected, then the navigation route may not be modified, and the service provider 501 may also be notified of the rejection.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

The invention claimed is:

1. A method, comprising:
   wirelessly pairing a portable electronic device with an on-board computer of a vehicle;
   wirelessly conducting a transaction between the portable electronic device and a third party wherein the third party is located external to the vehicle; and
   authenticating the transaction with the third party based on the level of trust established by the pairing of the portable electronic device with the on-board computer of the vehicle.

2. The method of claim 1, wherein said third party comprises a service provider.

3. The method of claim 1, further comprising generating the authentication with the third party based on pairing information provided by each of the portable electronic device and the on-board computer.

4. The method of claim 1, wherein said wirelessly conducting the transaction comprises conducting the transaction with the third party using a near-field communication (NFC) wireless interface.

5. A non-transitory computer-readable data storage device storing computer-executable instructions for a portable electronic device to:
   wirelessly pair the user's portable electronic device with an on-board computer of a vehicle;
   wirelessly conduct a transaction by the user using the portable electronic device and a third party, wherein the third party is located external to the vehicle; and
   authenticating the transaction between the user and the third party based on the level of trust established by the pairing of the portable electronic device with the on-board computer of the vehicle.

6. The non-transitory computer readable data storage device of claim 5, wherein the authenticated transaction with the third party comprises an authenticated transaction with a retailer.

7. The non-transitory computer-readable data storage device of claim 5, wherein the computer executable instructions further generates the authentication information with the third party based on pairing information provided by each of the portable electronic device and the on-board computer.

8. The non-transitory computer-readable data storage device of claim 5, wherein said wirelessly conducting the transaction comprises conducting the transaction with a device of the third party using a near-field communication (NFC) wireless interface.

9. A non-transitory computer-readable data storage device storing computer-executable instructions for an on-board computer of a vehicle to:
   wirelessly pair a user's portable electronic device with an on-board computer of the vehicle;
   wirelessly conduct a transaction by the user using the portable electronic device and a third party, wherein the third party is located external to the vehicle; and
   authenticate the transaction between the user and the third party based on the level of trust established by the pairing of the portable electronic device with the on-board computer of the vehicle.

10. The non-transitory computer-readable storage device of claim 9, wherein the authenticate transaction with the third party comprises an authenticated transaction with a retailer.

11. The non-transitory computer-readable data storage device of claim 9 wherein the computer executable instructions further generates the authentication information with the third party based on pairing information provided by each of the portable electronic device and the on-board computer.

12. The non-transitory computer-readable data storage device of claim 9, wherein said wirelessly conducting the transaction comprises conducting the transaction with a device of the third party using a near-field communication (NFC) wireless interface.

\* \* \* \* \*